No. 657,833. Patented Sept. 11, 1900.
H. M. REICHENBACH & J. SCHADELI.
PHOTOGRAPHIC SHUTTER.
(Application filed Mar. 7, 1900.)
(Model.) 5 Sheets—Sheet 3.
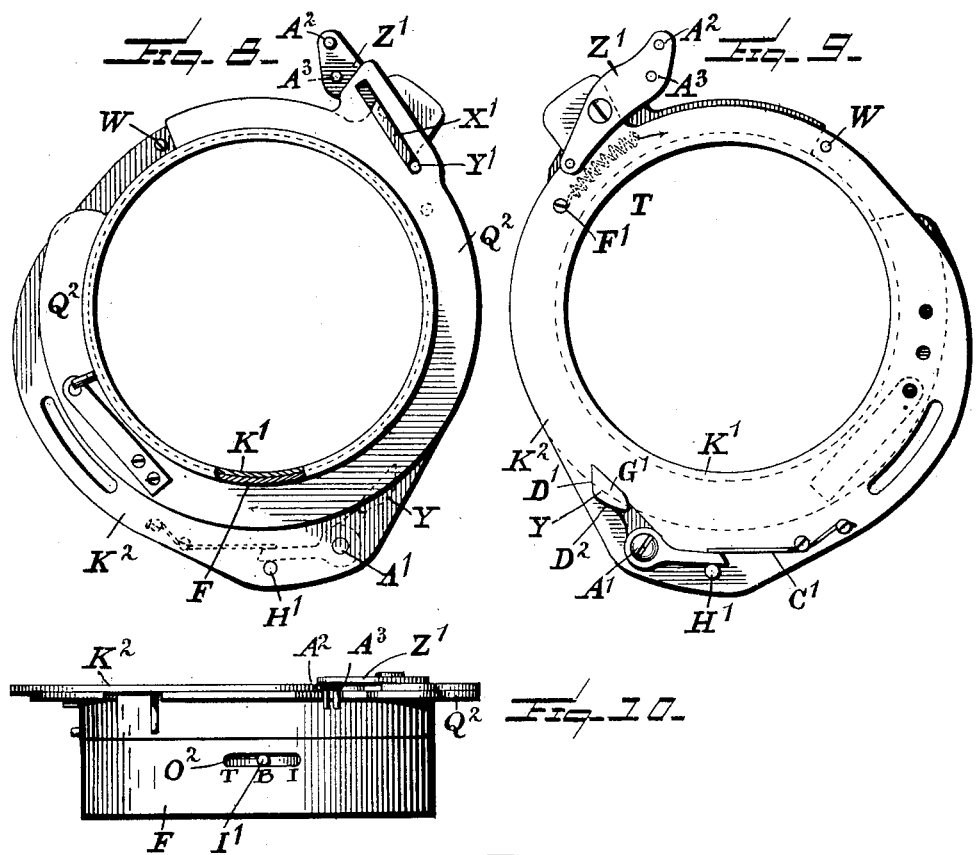
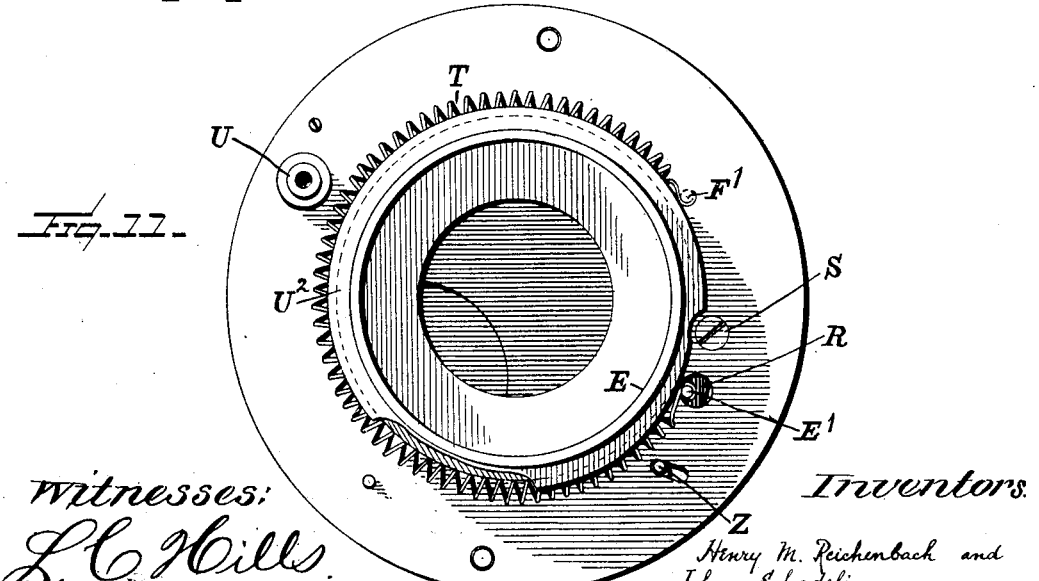
Witnesses:
L. C. Hills.
F. D. Frauel.
Inventors.
Henry M. Reichenbach and
John Schadeli,
By Geo. B. Selden, Atty.

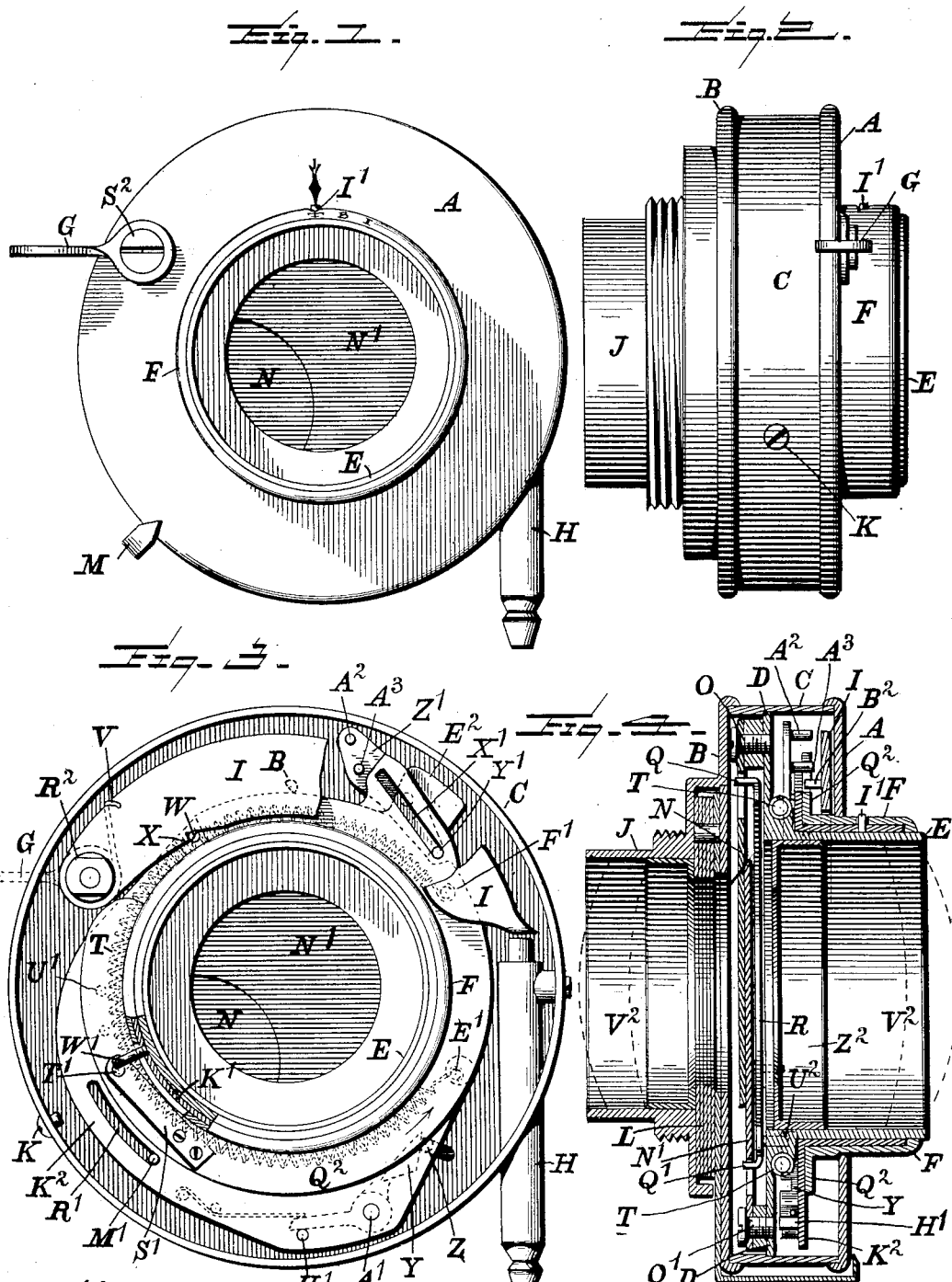

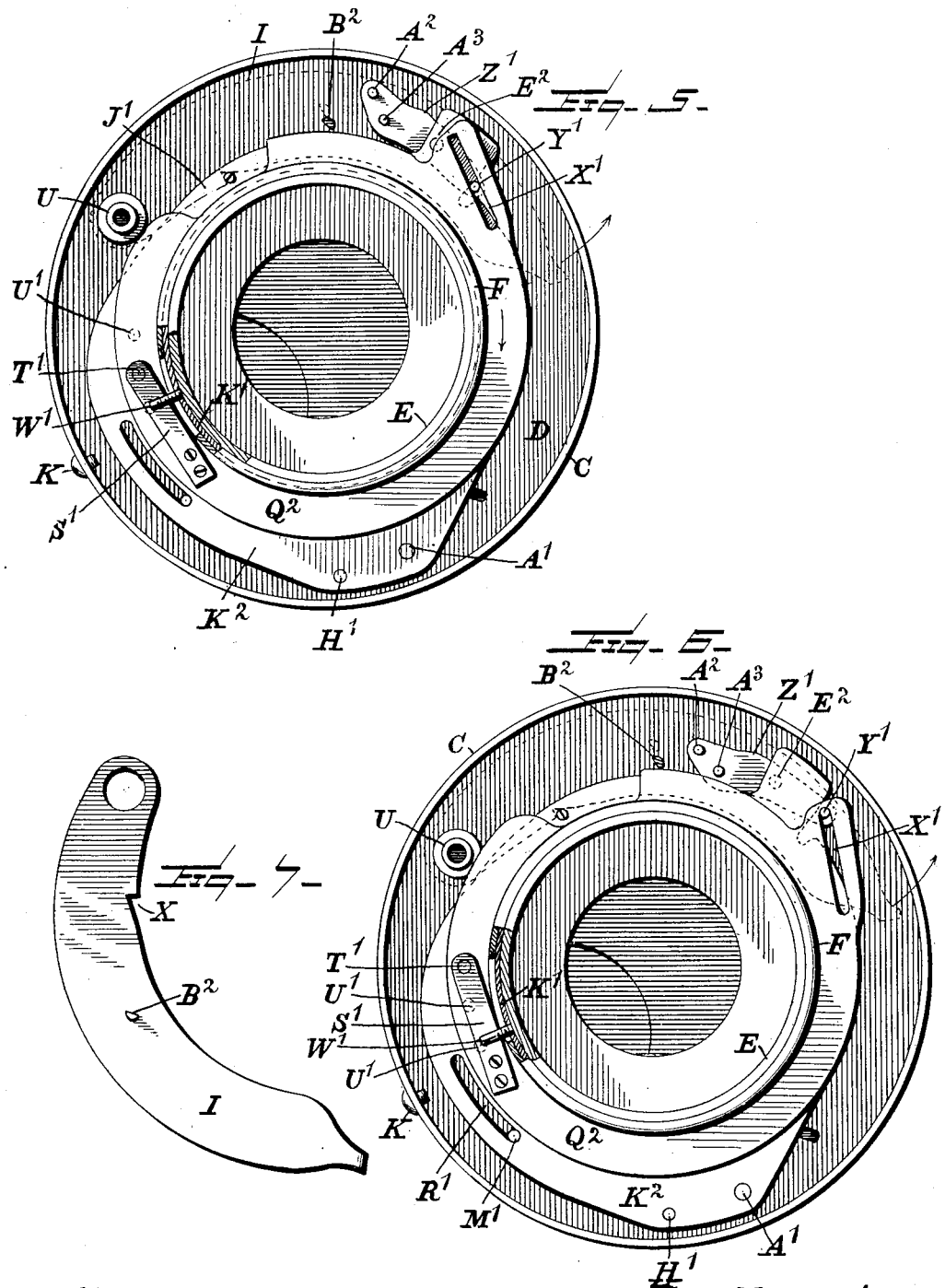

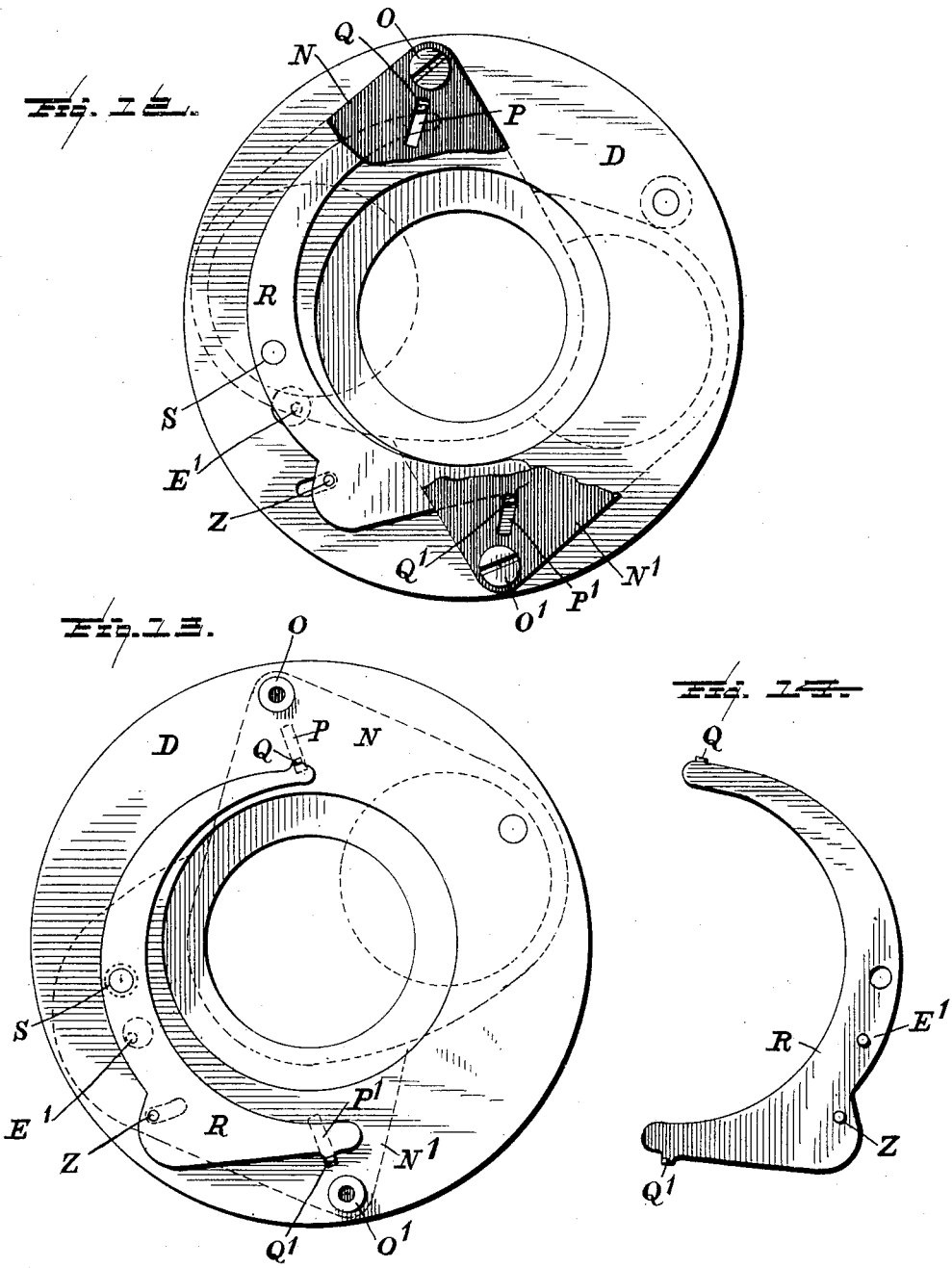

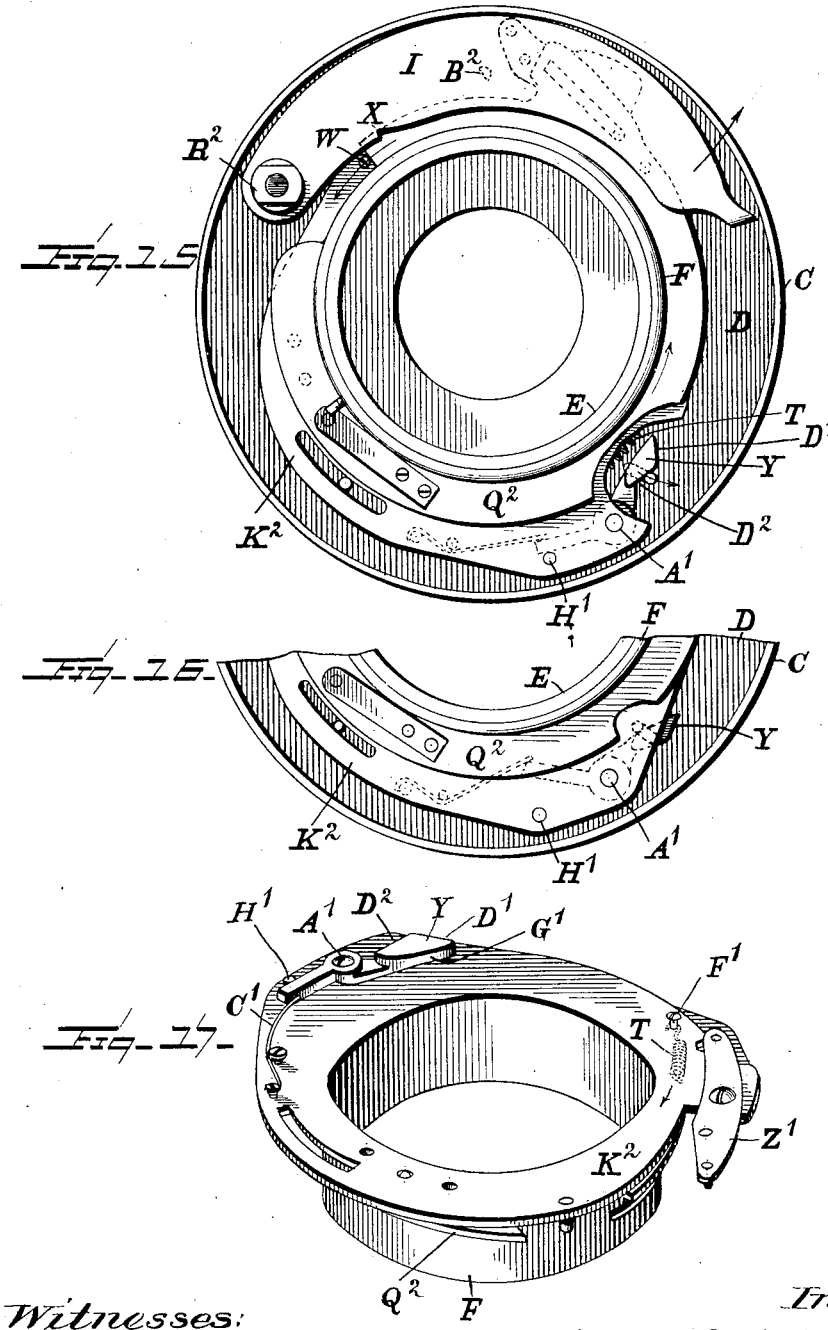

UNITED STATES PATENT OFFICE.

HENRY M. REICHENBACH AND JOHN SCHADELI, OF ROCHESTER, NEW YORK, ASSIGNORS TO THE REICHENBACH, MOREY & WILL COMPANY, OF SAME PLACE.

PHOTOGRAPHIC SHUTTER.

SPECIFICATION forming part of Letters Patent No. 657,833, dated September 11, 1900.

Application filed March 7, 1900. Serial No. 7,656. (Model.)

*To all whom it may concern:*

Be it known that we, HENRY M. REICHENBACH and JOHN SCHADELI, citizens of the United States, residing at Rochester, New York, have invented an Improved Photographic Shutter, of which the following is a specification, reference being had to the accompanying drawings.

Our invention relates to improvements in the construction and operation of photographic shutters, having for its object principally the making of the shutter absolutely dust-proof, as hereinafter more fully described.

Our improved dust-proof shutter is fully described and illustrated in the following specification and the accompanying drawings, the novel features thereof being specified in the claims annexed to the said specification.

In the accompanying drawings, representing a photographic shutter embodying our invention, Figure 1 is a front elevation. Fig. 2 is a side elevation of the shutter as seen from the left hand in Fig. 1. Fig. 3 is a front elevation, the front plate being removed. Fig. 4 is a central vertical section. Fig. 5 is a front elevation, the front and the releasing-lever being omitted. Fig. 6 is a similar front elevation showing the parts set in position for an exposure. Fig. 7 represents the releasing-lever detached as seen from the inside. Fig. 8 represents the operative parts detached as seen from the front. Fig. 9 represents the same parts as seen from the rear. Fig. 10 is a partial plan view of the setting-ring at the front of the shutter. Fig. 11 is a front elevation showing the circular coiled spring. Fig. 12 is a rear elevation, the rear plate being removed and the blades shown closed and partially broken away. Fig. 13 is a rear elevation showing the vibrating lever which actuates the blades, which are indicated by dotted lines. Fig. 14 represents the vibrating lever detached in rear elevation. Fig. 15 represents the shutter complete in front elevation. Fig. 16 is a partial view of the same parts. Fig. 17 is a perspective view of the setting-ring and its attachments.

Our invention is embodied in a shutter such as is represented in the accompanying drawings, and in which A is the front plate, B the rear plate, and C the circular casing in which is located the removable diaphragm D, carrying the front lens-tube E.

F is the setting-ring, by a partial rotation of which the shutter is set for an exposure, the setting-ring turning freely on the front lens-tube E.

G is the outer end of the release-lever, by depressing which an exposure is produced. Our improved shutter may also be provided with the ordinary pneumatic tube and plunger H, Fig. 3, arranged to produce either instantaneous, bulb, or time exposures, the plunger acting on the free end of release-lever I.

J is the tube for the rear lens, which may be provided with a screw-thread or other suitable device for the attachment of the shutter to the camera-front.

K, Figs. 2 and 3, represents the screw by which the removable diaphragm D is held in place in the case C, a shoulder being formed on the inside of the case and the diaphragm resting against it, as indicated in Fig. 4, and the screw K being inserted in front of the diaphragm.

An iris-diaphragm L may be employed in connection with the shutter, in any suitable location therewith, being provided with an operating-lever M, Fig. 1.

The construction and operation of the exposing-blades will be understood from Figs. 12 and 13. The exposing-blades are shown at N N'. The blades are pivoted to the diaphragm D at O O', Figs. 4 and 13. The blades are provided with slots P P', in which the bent lugs Q Q' of the vibrating lever R engage. The vibrating lever R is pivoted at S on a pin or screw passing through the diaphragm. The vibrating lever is shown in two different positions in Figs. 12 and 13 at the ends of its vibration, and it will be readily understood that the vibrating movement of the lever, operating through the lugs Q Q' and the slots P P' in the exposing-blades, will produce the requisite oscillation of the blades necessary to produce an exposure by admitting light through the central opening in the blades and the shutter. The blades are provided with a central aperture, as shown, and these two apertures coincide with each other and the central opening at the time of an exposure. For lightness and strength the exposing-blades are preferably made of hard rubber.

In the practical use of our improved shutter for instantaneous exposures the shutter is set by turning the setting-ring F a short distance from left to right in Fig. 1. The outer end of the setting-ring is preferably knurled to facilitate its manipulation by hand. This movement gives tension to the circular coiled spring T, Figs. 3, 4, and 11, and the exposure is produced by this spring turning the setting-ring F backward to its original position. The release-lever I is pivoted at U, Figs. 5 and 6, on a suitable stud and provided with a spring V, Fig. 3, which gives the right-hand end of the release-lever a constant tendency to swing downward or inward.

The release-lever I is provided with a projecting stud $R^2$, Figs. 3 and 15, which passes through the front plate or casing and has the thumb-piece G attached thereto in any suitable way—such, for instance, as by the screw $S^2$, Fig. 1. The stud $R^2$ turns on the post U, Figs. 3 and 5. The stud $R^2$ passes through the casing in a tight-fitting joint which will exclude dust.

W is a stud inserted in the flange $K^2$ of the time-exposure ring K', which engages with a notch X, Figs. 3, 7, and 15, to hold the time-exposure ring and setting-ring in the set position until released by a movement of the release-lever produced either by pressure on the thumb-piece G or by the pneumatic attachment. The setting-ring F is provided with the flange $Q^2$.

The exposing-blades are operated from the return movement of the setting-ring and the time-exposure ring by means of a pawl Y, Figs. 8, 9, 15, 16, and 17, which acts on a pin Z, passing through the diaphragm D in a suitable slot and inserted in the vibrating lever R. (See Figs. 12, 13, and 14.) The pawl Y is pivoted to the flange $K^2$ on the time-exposure ring K' at A', Fig. 17, and the pawl is provided with the spring C', attached to the flange and arranged to cause the pawl Y to swing inwardly, a suitable stop H' being employed to limit the movement. In Fig. 15 the flanges on the setting-ring and the time-exposure ring are partially broken away to show the pawl and the pin Z in the vibrating lever R. The pawl Y acts on the pin Z to give it an outward movement at first, which opens the blades to make an exposure, and they are then closed by the action of the circular coiled spring T. The pin Z projects through a slot in the diaphragm D a sufficient distance to reach into the path of the pawl Y. In setting the shutter the pin passes on the inside of the pawl, which yields outward, compressing the spring C'; but on the return movement of the setting-ring the inclined surface D' of the pawl Y forces the pin outward, causing the lever R to vibrate so as to open the blades, and then the oppositely-inclined surface $D^2$ permits the pin Z to be drawn inward by the circular operating-spring T, one end of which is hooked onto the pin E', Figs. 3, 11, and 14, inserted in the vibrating lever R and projecting through an opening in the diaphragm. The other end of the spring is attached to a pin or screw F', Figs. 11 and 17, on the flange of the time-exposure ring. It will thus be seen that the circular coiled spring T has thus a double action, one pulling on the pin F' to return the setting-ring to the unset position and the other end of the spring drawing on the pin E' and operating to close the blades by shifting the vibrating lever. When the setting-ring is turned from left to right to set the shutter, the pin Z travels along the inner surface G', Figs. 9 and 17, of the pawl Y, causing the pawl to swing outward; but on the return movement of the setting-ring after it has been released, the pawl being unable to swing inward on account of the stop H', the pin is thrust outward by the pawl as it travels along the inclined surface D', thus opening the blades, which are then closed by the pull of the spring T on the pin E', drawing the lower end of the vibrating lever R inward, (see Figs. 13 and 14,) so as to close the blades, while the pin Z passes inward along the inclined surface $D^2$. The lens-tube E is provided with a thickened collar $U^2$, Figs. 4 and 11, around the periphery of which is formed a groove which receives and sustains the circular coiled spring T. The flange $K^2$ of the time-exposure ring rests against the collar $U^2$, and the flange $Q^2$ of the setting-ring bears against the flange of the time-exposure ring, both being capable of rotatory movement relatively to the lens-tube and also independently of each other. The lens-tube E may be provided with an inner flanged ring $Z^2$, Fig. 4, forming the central aperture through the shutter. The setting-ring may be recessed in its interior to receive the time-exposure ring, as shown.

Proceeding now to a description of the mechanism for securing bulb or time exposures, these are produced by a rotary adjustment of the setting-ring that is other and different from the rotary movement of the ring requisite to set the shutter for the exposure. The time-exposure ring K' is provided with a pin I', Figs. 1, 4, and 10, which projects through the slot $Q^2$, Fig. 10, in the setting-ring. The flange $Q^2$ of the setting-ring F is cut away, as indicated at J', Fig. 5, so as to permit a certain amount of rotatory movement in the setting-ring relative to the time-exposure ring K', and the pin W, inserted in the time-exposure ring, serves to limit the rotary motion of the setting-ring relative to the time-exposure ring and to engage with the notch X in the release-lever. (See Fig. 3.) The rotary movement of the time-exposure ring is also itself limited by the pin M' inserted in the diaphragm and projecting into a slot R'. (See Figs. 3 and 6.) The consequence of this arrangement is that beside the rotatory movement of the setting-ring necessary for setting the shutter the ring can be rotated further, so as to bring any one of the marks "T" "B" "I," Figs. 1 and 10, opposite the pin I', in which case the shutter will be set for instantaneous, bulb, or time exposures, as the case may be. When once set in any one of the three positions relative to the time-exposure ring, the setting-ring is held in such position with sufficient firmness by the spring S', Figs. 5 and 6, attached to the flange $Q^2$ of the setting-ring and provided with a pointed pin T', which projects through such flange and engages in one of the holes or sockets U' in the time-exposure ring. The flange $Q^2$ of the setting-ring is held in contact with the flange on the time-exposure ring by a pin W', Figs. 5 and 6, passing through a slot in the setting-ring, which pin may also be used to limit the rotary movement of the setting-ring relative to the time-exposure ring instead of the pin W and the notch J', Fig. 5. The flange $Q^2$ of the setting-ring is provided with an inclined slot X', Figs. 5 and 6, which receives a pin Y' on one end of the time-exposure lever Z', which is provided with two pins $A^2 A^3$, which are interposed in the path of the pin $B^2$ (see Fig. 7) on the release-lever when it is desired to use the shutter for bulb or time exposures. The time-exposure lever Z' is pivoted at $E^2$, Figs. 5 and 6, to a projection on the flange of the time-exposure ring, so that it can be shifted by the inclined slot X' when the setting-ring is adjusted relative to the time-exposure ring. In Fig. 6 the parts are shown in the positions they occupy when the shutter is set for time exposures, the pin Y' being at the outer end of the slot X'. In Fig. 5 the parts are shown in the position they occupy when the shutter is set for bulb exposures, the pin Y' being at the middle of the slot.

In order to produce a time exposure, the time-exposure ring turns backward or from right to left with the setting-ring, and the pin $A^2$ comes in contact with the pin $B^2$ on the release-lever, which is now in the elevated position. Upon the release of the pressure on the bulb or on the thumb-piece G, so that the release-lever is pressed inward by its spring, it disengages the pin $B^2$ from the pin $A^2$; but the further rotatory movement of the setting-lever is arrested by the contact of the pin $B^2$ with the pin $A^3$, so that the blades are held open and the exposure continued until another movement of the release lever, which is given to it in order to terminate the exposure and which disengages the pins, so that the rings are allowed to complete their movement and the operating-spring to close the blades. The operation of these parts will be readily understood from Fig. 6. For a bulb exposure the pin $B^2$ on the release-lever occupies the upper position, (shown in dotted lines in Fig. 5,) and the movement of the setting-ring is arrested by the contact of the pin $A^3$ with the pin $B^2$, thereby arresting the blades in the open position until by the withdrawal of the pressure on the bulb the release-lever is allowed to assume its normal position, disengaging the pin $B^2$ from the pin $A^3$ and permitting the spring to close the blades.

It will be observed that the mechanism of our improved shutter is entirely inclosed within the case and that there are no openings whatever communicating between the interior and the outer air through which dust could possibly penetrate to interfere with the proper working of the operative parts or to form an accumulation on the inner surfaces of the lenses. It is believed that this highly-desirable result has never before been secured in a photographic shutter. Our invention is also cheap in construction and thoroughly durable and practical in use.

Any suitable retarding device to regulate the length of instantaneous exposures may be employed in connection with our improved dust-proof shutter.

Any suitable lenses are indicated at $V^2$, Figs. 9 and 4. As these of course are fitted tightly, the entrance of dust is prevented.

We claim—

1. The herein-described dust-proof shutter, having a casing entirely closed, and provided with the rotatory setting-ring concentric with the lens-tube, substantially as and for the purposes set forth.

2. The combination with a photographic shutter having a casing entirely closed, of the rotatory setting-ring concentric with the lens-tube, the release-lever having a pivot passing through the casing and suitable exposing mechanism, as and for the purposes set forth.

3. In a photographic shutter of the character described, the combination with a dust-proof casing entirely closed from the outside, of a projecting lens-tube, a setting-ring concentric with the said lens-tube, a release-lever having a pivot passing through the casing, and exposing mechanism; substantially as described.

4. In a photographic shutter, the combination, with the exposure mechanism, and a spring for operating the same, of a time-exposure ring, a setting-ring mounted on the time-exposure ring, and levers for operating the said rings; substantially as described.

5. The combination with suitable exposure mechanism of the projecting lens-tube, the time-exposure ring, provided with a time-exposing lever mounted thereon, the setting-ring mounted on the time-exposure ring, the release-lever and the operating-spring, as and for the purposes set forth.

6. The combination with suitable exposure mechanism, of the projecting lens-tube, the time-exposure ring provided with the time-exposing lever mounted thereon, the setting-ring mounted on the time-exposure ring, means for holding the rings in different positions of adjustment relative to each other, the release-lever and the operating-spring, as and for the purposes set forth.

7. The combination with the movable apertured blades, of the rotatory setting-ring provided with the pawl, the vibrating lever provided with a pin interposed in the path of the pawl, the release-lever and the operating-spring, as and for the purposes set forth.

8. The combination with the movable apertured blades of the rotatory setting-ring provided with the pawl, the vibrating lever provided with a pin interposed in the path of the pawl, the rotatory time-exposure ring provided with a time-exposing lever, means for securing the setting-ring and time-exposure ring in various positions of relative adjustment, the release-lever and the operating-spring, as and for the purposes set forth.

9. The combination with the movable apertured blades, of the rotatory setting-ring provided with a pawl, the vibrating lever provided with a pin interposed in the path of the pawl, the rotatory time-exposure ring provided with a time-exposing lever, means for securing the setting-ring and time-exposure ring in various positions of relative adjustment, the release-lever and the operating-spring attached at one end to one of the rings and at the other end to the vibrating lever, as and for the purposes set forth.

10. The combination with a suitable exposure mechanism of the rotatory setting-ring provided with a flange having an inclined slot, the rotatory time-exposure ring, the time-exposing lever pivoted thereon and provided with a pin engaging with the slot, means for securing the setting-ring and the time-exposure ring in different positions of adjustment, the release-lever and the operating-spring, as and for the purposes set forth.

HENRY M. REICHENBACH.
JOHN SCHADELI.

Witnesses to signature of Henry M. Reichenbach:
GEORGE A. GILLETTE,
GEORGE B. SELDEN.

Witnesses to signature of John Schadeli:
F. D. FRAUEL,
GEO. B. SELDEN.